(12) United States Patent
Zhai et al.

(10) Patent No.: US 8,298,505 B2
(45) Date of Patent: Oct. 30, 2012

(54) PROCESS FOR GAS SWEETENING

(75) Inventors: Suling Zhai, Reading (GB); John Foster, Winchester (GB); Stephen Ward, Middlesex (GB); Malcolm Harrison, Yateley (GB)

(73) Assignee: Foster Wheeler Energy Limited, Reading (GB)

( * ) Notice: Subject to any disclaimer, the term of this patent is extended or adjusted under 35 U.S.C. 154(b) by 0 days.

(21) Appl. No.: 13/133,776

(22) PCT Filed: Dec. 8, 2009

(86) PCT No.: PCT/GB2009/002845
§ 371 (c)(1),
(2), (4) Date: Jul. 20, 2011

(87) PCT Pub. No.: WO2010/067064
PCT Pub. Date: Jun. 17, 2010

(65) Prior Publication Data
US 2011/0300059 A1  Dec. 8, 2011

(30) Foreign Application Priority Data

Dec. 9, 2008  (GB) .................................. 0822448.7

(51) Int. Cl.
*C10L 3/10*   (2006.01)
*C01B 17/04*  (2006.01)
(52) U.S. Cl. ..................... 423/574.1; 48/127.3; 48/127.5
(58) Field of Classification Search ............... 423/574.1; 422/168, 187; 44/127.3, 127.5; 48/127.3, 48/127.5
See application file for complete search history.

(56) References Cited

U.S. PATENT DOCUMENTS

| 3,099,536 | A | 7/1963 | Urban et al. |
| 4,107,269 | A | 8/1978 | Rossarie et al. |
| 4,684,514 | A | 8/1987 | Chen |
| 6,962,683 | B2 * | 11/2005 | Gangwal et al. ........... 423/573.1 |
| 2002/0176816 | A1 | 11/2002 | Smith |
| 2004/0013590 | A1 | 1/2004 | Gangwal et al. |

OTHER PUBLICATIONS

International Search Report, PCT/GB2009/002845, dated Sep. 28, 2010, 7 pages.
Written Opinion, PCT/GB2009/002845, dated Sep. 28, 2010, 7 pages.
International Preliminary Report on Patentability, PCT/GB2009/002845, dated Feb. 9, 2011, 13 pages.
GB Search Report, Great Britain Application No. GB0822448.7, dated Apr. 9, 2009, 1 page.

* cited by examiner

*Primary Examiner* — Timothy Vanoy
(74) *Attorney, Agent, or Firm* — Senniger Powers, LLP

(57) ABSTRACT

A process for treating a gas stream comprising hydrogen sulphide, the process comprising the steps of: (i) mixing a first gas stream comprising hydrogen sulphide with a second stream comprising sulphur dioxide to produce a combined stream, whereby elemental sulphur is produced by a reaction between the hydrogen sulphide and the sulphur dioxide; (ii) removing elemental sulphur, and optionally water, from the combined stream; and (iii) oxidizing at least some of the elemental sulphur to form sulphur dioxide for use in the second stream, wherein the reaction is conducted at a temperature of from 15 to 155° C. and a pressure of at least 3 MPa.

14 Claims, 2 Drawing Sheets

PROCESS FOR GAS SWEETENING

REFERENCE TO RELATED APPLICATIONS

This application is the U.S. national stage application of International Patent Application No. PCT/GB2009/002845, filed Dec. 8, 2009, and claims the benefit of Great Britain Application No. 0822448.7, filed Dec. 9, 2008, the entire disclosures of which are incorporated herein by reference.

INTRODUCTION

The present invention relates to the purification of gases, more particularly to a process for the removal of hydrogen sulphide from a gas, and an apparatus for performing such a process.

BACKGROUND

The presence of hydrogen sulphide in gas streams can be detrimental to industrial processes, cause corrosion and interference in gas transportation and cause damage to health, safety and the environment. Accordingly, it is advantageous to remove hydrogen sulphide before such gases are transferred, used or vented to the atmosphere depending on the application.

Typically in sour natural gas processing applications the feed gas containing hydrogen sulphide is passed into an acid gas removal unit (AGR) where hydrogen sulphide is absorbed in an amine by a chemical reaction. Acid gases stripped from rich amine containing hydrogen sulphide are sent to a Claus based sulphur recovery unit (SRU), or alternatively may be injected into a depleted zone of the reservoir or a saline aquifer. However, an amine based gas treating process with Claus based SRU is a very costly scheme from both capital expenditure and operational points of view, and acid gas injection could have various issues ranging from potential risks to health and safety to the loss of a valuable product when the market of elemental sulphur is strong.

There is, therefore, a desire to provide an improved gas treatment process and/or apparatus which mitigates at least some of the problems associated with the prior art.

STATEMENT OF THE INVENTION

In a first aspect, the present invention provides a process for treating a gas stream comprising hydrogen sulphide, the process comprising the steps of:
  (i) mixing a first gas stream comprising hydrogen sulphide with a second stream comprising sulphur dioxide to produce a combined stream, whereby elemental sulphur is produced by a reaction between the hydrogen sulphide and the sulphur dioxide;
  (ii) removing elemental sulphur, and optionally water, from the combined stream; and
  (iii) oxidising at least some of the elemental sulphur to form sulphur dioxide for use in the second stream,
  wherein the reaction is conducted at a temperature of from 15 to 155° C. and a pressure of at least 3 MPa.

In a second aspect, the present invention provides an apparatus for treating a gas stream by performing the process as described herein, the apparatus comprising:
  an inlet for providing a first gas stream comprising hydrogen sulphide;
  an inlet for providing a second stream comprising sulphur dioxide;
  a reaction zone for combining the gas streams;
  a separation zone for removing elemental sulphur from the combined streams;
  means for oxidising a portion of the elemental sulphur to sulphur dioxide;
  means to pass the sulphur dioxide to the inlet for providing a second stream;
  means for providing the reaction temperature;
  means for providing the reaction pressure.

In a third aspect, the present invention provides a wellhead installation comprising the above apparatus. This can be located at an onshore or offshore site. Offshore sites include oil and gas rigs and floating oil/gas recovery platforms.

In a fourth aspect, the present invention provides a further process for treating a gas stream comprising hydrogen sulphide, the process comprising the steps of:
  (i) mixing a first gas stream comprising hydrogen sulphide with a second stream comprising sulphur dioxide to produce a combined stream, whereby elemental sulphur is produced by a reaction between the hydrogen sulphide and the sulphur dioxide;
  (ii) removing elemental sulphur from the combined stream; and
  (iii) oxidising at least some of the elemental sulphur to form sulphur dioxide for use in the second stream,
  wherein, the first gas stream is hydrogen sulphide-containing natural gas.

FIGURES

The present invention will now be described further with reference to the accompanying drawings provided by way of example, in which.

DETAILED DISCLOSURE OF THE INVENTION

Figure 1:
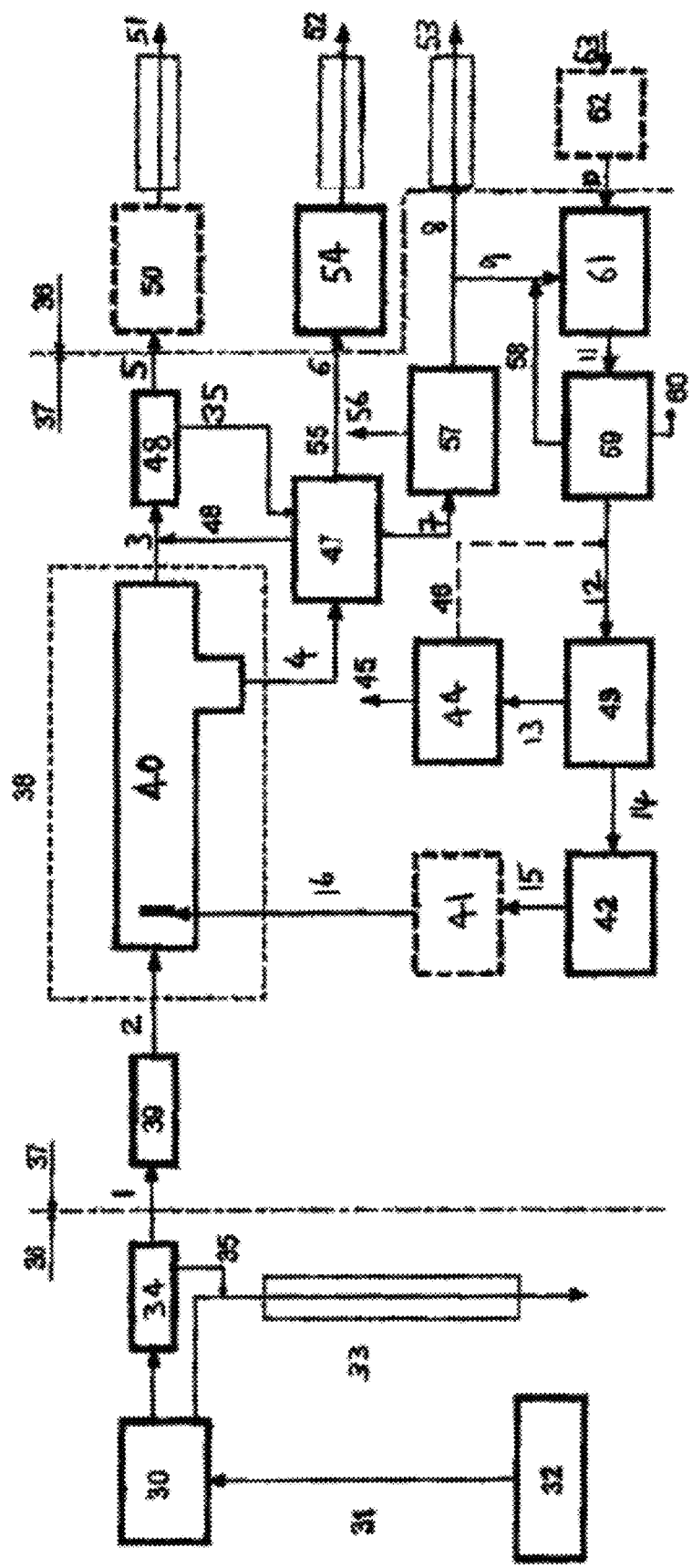
FIG. 1 shows a flow diagram of the process for the bulk hydrogen sulphide removal and an apparatus of one embodiment of the present invention.

The present invention will now be further described. In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Unless otherwise stated, all percentages are on a molar basis.

The process of the present invention is directed to the cost-effective removal of sulphur species from a gas stream that comprises hydrogen sulphide, and preferably the direct removal of such species. The process may be carried out either onshore, or offshore. Typically the gas stream will be comprised of hydrocarbons, carbon dioxide and hydrogen sulphide. However, it will be understood that other gases may be present. The process of the present invention is preferably performed on gas sources comprising from 0.05 to 50% by volume of hydrogen sulphide, more preferably from 0.1 to 40% and most preferably from 2 to 35%, or from 5 to 20% by volume of hydrogen sulphide based on the total volume of gas.

The process removes at least a portion of, and preferably all of, the hydrogen sulphide from the gas stream. That is, the process preferably removes at least 50% by volume of the hydrogen sulphide, more preferably 75%, even more preferably 90% and most preferably 98%. It is especially desirable to produce a sweetened gas suitable for commercial sale.

The process of the present invention is suitable for the removal of hydrogen sulphide from any hydrogen sulphide containing gas stream. The invention will be described particularly in relation to hydrogen sulphide-containing (sour) natural gas streams and hydrogen sulphide-containing carbon dioxide gas streams. Hence, where the description discusses natural gas treatment, one skilled in the art would appreciate that the method could be applied to other hydrogen sulphide-containing gas streams.

In one embodiment of the present invention, the sour gas is natural gas. Natural gas is a gaseous fossil fuel comprising primarily of flammable hydrocarbons. A flammable hydrocarbon is one that burns readily on ignition in the presence of oxygen. The hydrocarbons include, methane, ethane, propane, butane, alkanes, alkenes and alkynes. Ignoring hydrogen sulphide impurities, natural gas preferably comprises at least 50% methane, more preferably 75% and most preferably 90%. Natural gas can include up to 10% of each of ethane, propane, butane, and pentane. It can also contain some small amounts (less than 2%) of volatile heavier hydrocarbons, although these are removed from the gas prior to sale. Natural gas is commonly found with impurities including carbon dioxide, nitrogen, helium and hydrogen sulphide. It is found in oil wells, gas wells, condensate wells and in coal beds. In this embodiment the pressure is desirably provided by the natural gas source. That is, when the gas is extracted from the ground it is obtained at a pressure in the tens of MPa. An advantage of this embodiment is that there is no energy cost involved in using the high pressures required by the present invention. The pressure of the reaction is therefore only limited at the upper end by the highest pressure that natural gas can be found at in a gas well. It is common for such pressures to be up to 40 MPa. More common natural pressures are in the range of 5 to 15 MPa. The preferred pressure used may be achieved by reducing the pressure of the gas passing into the apparatus.

The process of the present invention comprises a number of steps. It would be understood by one skilled in the art that, by the very nature of the process, the steps may be carried out concurrently and need not be carried out sequentially. Indeed, it is preferred that the process is carried out continuously.

The first step involves mixing a first gas stream comprising hydrogen sulphide with a second stream comprising sulphur dioxide to produce a combined stream, whereby elemental sulphur is produced by a reaction between the hydrogen sulphide and the sulphur dioxide. This step may be carried out in a reaction zone. Preferably this step involves some turbulent flow of the gases to encourage thorough mixing.

This step may involve obtaining, drilling for, storing and/or preparing the sour gas (the gas stream comprising hydrogen sulphide), and directing the gas into the apparatus for performing the process. The gas is passed as a stream through the apparatus. Preferably, the gas is treated as a continuous process, rather than as a batch process.

The second stream comprising sulphur dioxide may be provided as a liquid and injected into the reaction zone. However, it is preferred that the stream comprising sulphur dioxide is a gas stream as this increases the mixing of the first and second streams and increases the speed of the reaction.

It is preferred that the second stream is essentially pure sulphur dioxide with only unavoidable impurities therein.

Alternatively, in another embodiment, the sulphur dioxide may be supplied in a carrier stream. The carrier may correspond to the treated gas stream.

The conditions under which the gas streams are mixed in step (i) are: a temperature of from 15 to 155° C. and a pressure of at least 3 MPa. It is advantageous to carry out the reaction at temperatures lower than 155° C. because above this temperature the viscosity of sulphur increases due to polymerisation. This makes sulphur removal more difficult. Treating the gases at temperatures below 15° C. is unfavourable for kinetic reasons.

Preferably the temperature under which the gas streams are mixed in step (i) is from 115 to 155° C. This is advantageous as at temperatures above 115° C. sulphur may be removed in step (ii) as a low viscosity liquid, rather than a solid. Below approximately 115° C. the sulphur removed in step (ii) will be a solid.

The pressure used in step (i) is greater than 3 MPa, more preferably it is greater than 7 MPa.

The present inventors have advantageously found that the reaction of the present invention may successfully be carried out at these relatively low temperatures, and high pressures. This is a balance of the reaction yield (which requires higher pressures) and the cost of producing such high pressures. This is discussed in more detail below.

The basic chemical reactions occurring in the present invention are represented by equations:

$$2H_2S + SO_2 \xleftrightarrow{\text{High Pressure}} 2H_2O + \frac{3}{x}S_x \quad \text{Eq. (1)}$$

$$S_x + xO_2 \rightarrow xSO_2 \quad \text{Eq. (2)}$$

where x=1 to 8. Reacting $H_2S$ and $SO_2$ at high pressures and moderate to low temperatures (Eq. (1)) is exothermic and the generated sulphur is predominately in the form of $S_6$ and $S_8$ since the average molecular weight of product sulphur increases with decreasing temperature and with increasing sulphur partial pressure.

It is well known to those skilled in the art that the theoretical equilibrium conversion of hydrogen sulphide by reaction (1) to elemental sulphur decreases with increasing temperature at low temperatures (e.g. below 560° C. at 1 atm), but increases with increasing temperature at high temperatures (e.g. above 560° C. at 1 atm) due to the existence of several sulphur species in the gas phase. The influence of pressure on the conversion ratio of reaction (1) is similar. High pressure is thermodynamically favourable for the forward reaction of Eq. (1) at low temperatures, but becomes thermodynamically detrimental at relatively high temperatures.

The present inventors have found that under conditions of high pressures and low temperatures, the conversion ratio of reaction (1) is very high and may be close to 100%. Hence the reverse reaction rate is negligible in comparison to the forward reaction rate. High reaction pressures also increase the reaction rate of Eq. (1) as partial pressures of the reactants (i.e. $H_2S$ and $SO_2$) are enhanced. Therefore carrying out the reaction at high pressures enables it to occur at low temperatures without costly catalysts as in the conventional modified Claus process.

Advantageously the inventors have discovered that, under the reactive conditions of the process of the present invention, it is not necessary to include a catalyst. That is, no catalyst is required to cause the hydrogen sulphide to react with the sulphur dioxide to produce elemental sulphur. This is particularly beneficial as it removes the need for regenerating the catalyst that is prone to clogging with sulphur deposits. In all Claus processes known in the art sulphur clogging is a long standing problem.

It will be understood, however, that a catalyst may be used to catalyse the reaction of hydrogen sulphide and sulphur dioxide. Suitable catalysts are well known in the art and include, but are not limited to, nitrogen containing compounds, for example ammonia or amines.

Preferably the flow rate of the second stream is adjusted to maintain stoichiometric ratio of moles of sulphur dioxide: moles of hydrogen sulphide of 1:2-2.5. More preferably it is 1:2.1-2.3. Adjustments may be made by controlling the second stream or, by diluting it with a carrier.

In step (ii) elemental sulphur, and preferably water, is removed from the combined stream. It is preferred that the water produced is removed concurrently with the sulphur.

The remaining gas stream, which comprises sweetened gas, is removed from the system for further treatment, storage, use, distribution or sale. In one embodiment, a portion of the gas is recycled back into the system as the first gas stream. This allows for further treatment of the sour gas and removal of more hydrogen sulphide.

The separation or removal of produced sulphur and/or water may be conducted by any separation process known in the art. Especially preferred methods include gravity separation and centrifuging. Filtration may also be used but is less preferred due to clogging.

In one embodiment of the present invention, the elemental sulphur and water is removed in step (ii) by gravity and is separated into a sour water stream and a liquid sulphur stream. Preferably, the liquid sulphur stream is degassed and purified. The liquid sulphur stream may then be divided into a sulphur product stream for storage and a sulphur reactant stream for the generation of $SO_2$.

Step (iii) involves oxidising at least some of the elemental sulphur to form sulphur dioxide for use in the second stream. This step may be conducted in batches or as a continuous process, depending on the requirement for the sulphur dioxide. The preferred oxidation process used is combustion, although other oxidisation methods are known. The most common oxidisation product is $SO_2$.

The combustion step may be conducted in the presence of air. In one embodiment it may be conducted in oxygen-enriched air. Oxygen-enriched air means air having more than 21% oxygen (by volume), or more than 50%, or more than 60% and up to 100% oxygen (by volume). The generated sulphur dioxide may be separated and purified by liquefaction.

The combustion of sulphur may be carried out in a sulphur furnace. Typically the oxygen-containing gas stream will be introduced into the sulphur furnace at a pressure of from 0.1 MPa to 0.7 MPa. Preferably, the oxygen-containing gas stream will be dehydrated prior to charging the furnace. Typical stream conditions for the sulphur entering the sulphur furnace are temperatures of approximately 140° C., pressures from 0.1 MPa to 0.7 MPa and the air entering the furnace is in the temperature range of from 60 to 100° C. However, it will be understood by those skilled in the art that any suitable conditions may be used.

The sulphur dioxide generated in step (iii) is preferably purified, and pressurised and pumped into the reaction mixture of step (i), i.e. into the reactive mixer/separator. Thus, sulphur may be recycled in this process. The generated sulphur dioxide may be heated prior to charging it into the reaction zone.

The present invention also relates to an apparatus for performing the gas sweetening process of the present invention. The apparatus comprises: an inlet for providing the first gas stream comprising hydrogen sulphide; an inlet for providing a second stream comprising sulphur dioxide; a reaction zone for combining the gas streams; a separation zone for removing elemental sulphur from the combined streams; means for oxidising at least a portion of the elemental sulphur to sulphur dioxide; means to pass the sulphur dioxide to the inlet for providing a second stream; means for providing the reaction temperature; and means for providing the reaction pressure.

Preferably the reaction zone has a design space velocity of 0.03 to 1 $s^{-1}$. This is a balance between ensuring adequate mixing of the gases, suitable reaction kinetics, capital cost, and operability.

The separation zone may be an active separator (such as a centrifuge or rely on pressure changes) or a passive separator (such as a gravity or enhanced separator). The separator may work as a bulk removal unit for the elemental sulphur and water produced and can be followed by another high efficiency separator/filter to further clean the gas up.

If an enhanced separator is used, the high velocity (at least approximately 10 $ms^{-1}$) of the gas stream results in a high sweeping force for the liquid/solid product phase, which reduces the amount of sulphur deposited onto the equipment or pipeline surface, and avoids plugging of the equipment due to the elemental sulphur generated.

In one embodiment the reaction zone and the separation zone are one and the same. This is because the speed of the reaction is so great that the sulphur is produced and removed as the gases are mixed.

The reaction zone may be single stage (i.e. have one injection point) for the first gas stream and/or second gas stream. Alternatively, the reaction zone may be multi-stage (i.e. have multiple injection points) for the first gas stream and/or second gas stream. If the process is multi-stage, preferably interstage coolers are used. If the hydrogen sulphide level is high in the feed stream then it is advantageous to use multiple stage/injection points to control the reactor temperature within the required range.

In another embodiment the apparatus further comprises a dehydrator to extract water from the elemental sulphur. This also serves to drive the forward equilibrium of the reaction. The water is preferably recovered concurrently with the elemental sulphur and the water and sulphur are separated afterwards.

The apparatus can include a catalyst. Preferably it does not. Common catalysts that could be used are those known in the Claus process and include: $Fe_2O_3$, activated alumina activated titania, and nitrogen containing compounds, for example ammonia or amines.

The means for oxidising at least a portion of the elemental sulphur is preferably a combustion unit. The portion of the sulphur to be combusted is determined by the ratio of hydrogen sulphide to sulphur dioxide in the reaction gases entering the catalytic converters. The combustion of sulphur is exothermic and waste heat can be used to produce a hot utility stream and/or electricity and/or to heat any part of the process system. It could, for example be used to volatilise the stream comprising sulphur dioxide before it passes through the inlet. The means for oxidising can be associated with a means for separating the sulphur dioxide. It is preferred that the separating means operate by liquefaction.

In one embodiment the apparatus further comprises a controller arranged to control the gas stream treatment apparatus. In this embodiment the apparatus also comprises a computer-readable medium coupled to the controller and having a computer-readable program embodied therein that directs operation of the gas stream treatment apparatus. The computer readable program has instructions that, when executed by the controller generate a temperature within the reaction zone of from 15 to 155° C., provide a pressure of at least 3 MPa, and control the inlet for providing a first gas stream and the inlet for providing the stream comprising sulphur dioxide.

The invention also provides the above apparatus located adjacent to a wellhead. In this embodiment the apparatus is arranged so that it can use, directly or indirectly, the pressure of the gas source in the reaction. This has a number of benefits, including reducing the costs involved in producing the high pressures and removing the corrosive $H_2S$ before the gas is passed into a distribution system.

In the fourth aspect of the present invention there is provided a further process for treating a gas stream comprising hydrogen sulphide, where the gas stream is a sour natural gas. The benefit of this method is that it can be directly applied to the flammable gas without requiring a first extraction step to remove the acid/sour gas from the main gas stream.

In one embodiment of the present invention, a process is disclosed for the bulk removal of $H_2S$ from a sour natural gas stream. The reactor may be located either upstream or downstream of the pipeline. $H_2S$ reacts with slightly deficit $SO_2$ (5% less than the stoichiometric amount of $SO_2$) at moderate high pressures and moderate low temperatures, and major part of the produced water and elemental sulphur are condensed out and removed in liquid phase from the system to favourably displace chemical equilibrium. The $SO_2$ stream is generated by burning part of the produced elemental sulphur in air. The relatively sweetened natural gas stream is further treated in a gas processing plant with its size significantly reduced and the size of the sulphur plant is also decreased.

In one further exemplary embodiment of the present invention, a process is disclosed for the bulk removal of $H_2S$ from a $CO_2$ stream from a natural $CO_2$ gas field, power plant or gasification plants. $H_2S$ reacts with the stoichiometric amount of $SO_2$ at high pressures and relatively low temperatures. Most part of the elemental sulphur generated is dissolved in the supercritical $CO_2$ at the reacting conditions but is removed from the bulk stream along with the produced water by displacing the fluid outside the supercritical region. The $SO_2$ stream is generated by burning part of the produced elemental sulphur in air. The desulphurised $CO_2$ stream is further conditioned, e.g. by passing adsorption beds, to meet its specifications on sulphur and water before pipeline transmission.

In an alternative embodiment of the present invention, a process is disclosed for the removal of $H_2S$ from an acid gas stream produced by an amine unit. In this case, the ratio of $CO_2$ to $H_2S$ is high and an acid gas enrichment unit is required if a conventional modified Claus based sulphur recovery approach is selected. Using the disclosed process could potentially eliminate the amine unit, the acid gas enrichment unit and the Claus sulphur plant downstream.

The invention will now further be described with reference to the Figures.

The numbers in FIG. 1 relate to the following features:
30. GOSP
31. Sour Gas (HC, $CO_2$, $H_2S$, and organic S)
32. Sour Gas Fields
33. Crude Oil Stabilisation/Export (if applicable)
34. Filter/Coalescer
35. Liquids
36. Open Art
37. Patent
38. HP Bulk $H_2S$ Removal System
39. Heat Ex.
40. Reactive Mixer/Separator
41. Heater (Optional)
42. Pump/Buffer Storage
43. $SO_2$ Purification System
44. FGD Scrubber/Regenerator
45. Vent
46. Recycled $SO_2$ (Optional)
47. Three-phase Separator
48. Flashed Gas
49. Filter/Coalescer
50. Further Processing (Optional)
51. Gas Export Pipeline
52. Water re-injection or vent line
53. Sulphur for storage
54. Water Treatment
55. Sour Water
56. Vent $H_2S$(HOLD)
57. Sulphur Degassing Unit
58. Recycled Sulphur
59. Waste Heat Boiler/Cooler/Condenser
60. HP&LP steam for power/heating
61. Sulphur Furnace
62. Compr./Dehy. (Optional)
63. Air Illustrated in FIG. 1 is an exemplary process for the sour gas treatment and an apparatus embodying the present invention. Sour gas from a wellhead is passed into a gas oil separator (GOSP), followed by further filtering and coalescing. The gas (1) is then routed into heat exchangers for preheating. The heated gas stream (2) is charged into the reactive mixer/separator, where $H_2S$ reacts with a $SO_2$ stream and is converted into elemental sulphur and water. The relatively sweetened gas stream (3) is passed via a filter, coalescer or an alternative high efficiency separator to remove the entrained liquid/solid sulphur and residual $SO_2$. The treated stream (5) is then directed into a gas plant for further processing or pipeline for export.

Depending on the reactor conditions chosen, the product water will form as liquid and the product sulphur will form as liquid or solid. They can be easily removed from the gas stream to shift the reaction equilibrium to the right side of Eq. (1). The combined water and elemental stream (4) is routed into a three-phase separator where it is divided into a sour water stream (6), an elemental sulphur stream (7) and a flash gas stream, which is then mixed with stream (3). A let-down system may be placed upstream or downstream of the three-phase separator. The sour water stream (6) is subjected to further treatment to meet the discharge limits or co-mingled with the produced water from reservoir for reinjection. If produced in the liquid phase, the elemental sulphur stream (7) is degassed before it is divided into a sulphur product stream (8) for storage and a sulphur reactant stream (9) for the generation of $SO_2$. Degassing may be achieved by agitation with air stripping or by the addition of a catalyst. The portion of the sulphur to be combusted is determined by the ratio of hydrogen sulphide to sulphur dioxide in the reaction gases entering the reactive mixer/separator, which is preferably controlled in the range of the stoichiometric proportion of 2-2.5 moles of hydrogen sulphide to 1 mole of sulphur dioxide. The ratio of $H_2S/SO_2$ in the feed gas is maintained by control of the flow rate of the $SO_2$ from the intermediate storage vessel based on an advanced control system.

Elemental sulphur (9) is combusted with an oxygen containing gas stream (10) in a sulphur furnace at a pressure in the range of 0.1 to 0.7 MPa [1-7 bar].

The hot combustion gas stream containing $SO_2$ (11) is passed through a series of heat exchangers to recover heat.

The $SO_2$ stream (14), with a low level of inert gas e.g. nitrogen, is separated from the chilled gas stream (11) by liquefaction, absorption, or other separation process known in the art. The inert gas containing a small amount of $SO_2$ (13) is scrubbed in a flue gas scrubber/regenerator system using a solvent such as CANSOLV® before venting to the atmosphere. The recovered $SO_2$ may be recycled to mix with stream (12). The $SO_2$ stream (14) is sent to a buffer storage vessel from where it is pumped to the required feed pressure. The high pressure $SO_2$ stream (15) is optionally heated to enhance mixing with the feed gas stream within the reactive mixer/separator. The heated high pressure $SO_2$ stream (16) is introduced into the reactive mixer/separator where the reaction and separation takes place.

It will be understood that the process shown in FIG. 1 is illustrative of only one embodiment of the present invention. The accompanying feed conditioning and utilities may be located upstream of the pipeline as close to the reservoir as practical, or downstream of the pipeline located close to or in the gas processing plant depending on the location/distance of the gas field and the gas composition e.g. $H_2S$ level. The reactive mixer/separator can be a single-stage reactor as illustrated in FIG. 1, a multiple-stage reactor, or multiple single-stage reactors working in parallel wherein the stream (3) and (4) will be a co-mingled stream from all the parallel reactive mixers/separators. The $SO_2$ stream (16) may also be introduced into the reactive mixer/separator via one or multiple inlets.

Figure 2:
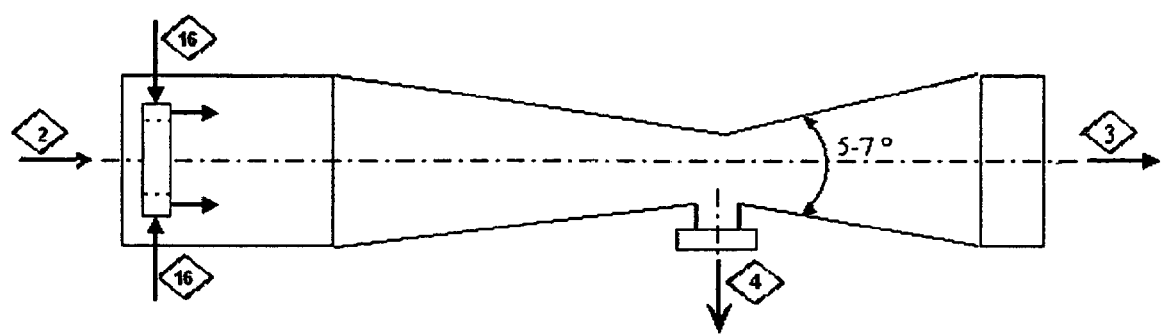
FIG. 2 shows an example of a configuration of a high pressure reactive mixer/separator which may be used in the present invention.

The reactive mixer/separator may, for example, have a design similar to that shown in FIG. 2. Alternatively, an alternative advanced unit may be utilised which offers intensive mixing and efficient separation, such as TWISTER™. The reactive mixer/separator may also comprise a static mixer and/or hydrocyclone technology.

The process and apparatus of the present invention provide a number of advantages over known processes and apparatuses. Some of these advantages will be briefly discussed below.

One benefit of the disclosed process is that, the produced water and sulphur are condensed out at high pressures, therefore a major part of these products may be removed from the gas stream in-situ to favourably push the chemical equilibrium of Eq. (1) to the right hand side. Attempts to accomplish the removal of produced water in conventional modified Claus process attempts have so far failed, primarily because of the plugging issue of the equipment due to the solid sulphur produced and the corrosiveness of the aqueous condensate. Thus the presence of water vapour in the reaction gases throughout the conventional sulphur plant imposes a definite limitation on the degree of conversion.

Another benefit of the disclosed process is that the molar heat of reaction for Eq. (1) is relatively small, permitting operation at comparatively low temperatures and consequently, the attainment of a high conversion to sulphur without the addition of an external heating system. Depending on the $H_2S$ level in the feed stream and the targeting $H_2S$ removal ratio, heat generated by Eq. (1) may be removed from the reaction zone to keep the reactor temperature in the preferred temperature range. Keeping the produced sulphur above its melting point avoids adding equipment and greater complexity to sulphur removal processes.

The disclosed process may be energy self-sufficient. Reaction (Eq. (1)) is slightly exothermic. Burning elemental sulphur in an oxygen containing stream by reaction will generate substantial energy for use in the process as steam, electricity or the like.

A further benefit of the disclosed process is the suppression of undesirable side reactions, e.g. COS and $CS_2$ production. The presence of carbon dioxide and light hydrocarbons in the feed gas, results in the formation of carbonyl sulphide and carbon disulfide in any high temperature reaction. Various reaction mechanisms have been proposed for the formation of carbonyl sulphide and carbon disulfide and for their subsequent hydrolysis to hydrogen sulphide and carbon dioxide. Equilibrium constants for the hydrolysis of COS and $CS_2$ indicate that the reaction equilibrium is favoured by low temperatures.

$$CS_2+H_2O \rightleftharpoons COS+H_2S \qquad \text{Eq. (3)}$$

$$COS+H_2O \rightleftharpoons CO_2+H_2S \qquad \text{Eq. (4)}$$

The equilibrium constants for Eq. (3) and Eq. (4) increase in the magnitude of $10^5 \sim 10^6$ and $10^3 \sim 10^4$ respectively when the reacting temperature decreases from 1000° C. to 100° C. Furthermore, the elemental sulphur produced at high pressures is more easily condensed out in liquid phase instead of staying in vapour phase as in conventional Claus process, which is also good for the suppression of the side reactions. Therefore, compared to the conventional Claus reaction, the formation of COS and $CS_2$ is less of a problem in the invented process. It is preferred that COS and $CS_2$ impurities in the product gas are less than 1%, more preferably less than 0.01% and most preferably less than 0.001%.

Further benefits of the present process include mitigation of corrosion during sour gas pipeline transportation by sweetening the gas stream upstream and the removal of the water produced.

As sulphur in the present invention may be recycled, the process of the present invention will be competitive whether the sulphur market is weak or strong.

Overall, both capital investment and operation costs may be significantly reduced by using the technology disclosed in this invention even if it is employed as a preliminary removal step followed by a smaller amine unit and sulphur plant. The efficiency and speed of the process is greater by the direct processing of a gas stream rather than using a preliminary separation step, such as an amine scrub, and separate gas treatment system.

Finally the process disclosed in this invention is relatively simple, compact, and safe. Therefore, in one embodiment, the invention can be applied for offshore applications.

EXAMPLES

The invention will now be exemplified with reference to the following non-limiting examples. Unless otherwise indicated, parts, percentages and ratios are on a molar basis. Each and every feature of this embodiment can be used in isolation from, or together with, any of the features set out in the description.

Example 1

This example illustrates bulk removal of $H_2S$ from a sour natural gas stream using a single-stage reactive mixer/separator as disclosed in this invention.

A gas processing plant receives 1.5 BSCFD sour gas from an offshore gas field, containing $H_2S$ 2% and $CO_2$ 8%. The flowing wellhead pressure and temperature are 4.35 MPa [43.5 bar] and 90° C. respectively.

The entire sour gas stream is firstly preheated to 121° C., and introduced into the reactive mixer/separator, in which it reacts with a $SO_2$ stream adiabatically. The reaction pressure is 7 MPa [70 bar]. The reactive mixer/separator used in this case is single-stage. The water generated in the reaction, accounting for 330~500 t/d (depending on the export temperature of the relatively sweetened gas stream) and the elemental sulphur product, accounting for 1170 t/d, are removed concurrently from the reactive mixer/separator in liquid phase. The relatively sweetened gas stream containing 0.1% of $H_2S$ is routed for further processing before export. Energy generated during combustion is sufficient for preheating the feed gas, driving the steam turbines for the compressors used for air and/or $SO_2$ streams and in the refrigeration plant.

Example 2

This example illustrates bulk removal of $H_2S$ from a super sour natural gas stream using a two-stage reactive mixer/separator as disclosed in this invention.

A gas processing plant receives 950 MMSCFD sour gas from an onshore field, containing $H_2S$ 30% and $CO_2$ 10%. The gas pressure and temperature entering the gas plant are 8 MPa [80 bar] and 50° C.

The entire sour gas stream is introduced into a serial two-stage reactive mixer/separator at the receiving conditions where its $H_2S$ level is reduced from 30% to 0.6% by reacting with $SO_2$. Heat generated in the reaction is removed efficiently to control the reaction temperature in the range of 115 to 155° C. At the reaction temperature and pressure, both the reaction products water and sulphur are in the liquid phase and a portion of the generated elemental sulphur is oxidised with air to produce $SO_2$. The reaction product water, accounting for 5,400 t/d and elemental sulphur, accounting for 11,000 t/d, are removed concurrently from the reactive mixer/separator in liquid phase. The relatively sweetened gas stream is routed for further processing before export. The energy generated during sulphur combustion is sufficient for driving the steam turbines for the compressors used for air and/or $SO_2$ streams and in the refrigeration plant, and with 300 to 400 MW energy in surplus.

Example 3

This example illustrates bulk removal of $H_2S$ from high pressure $CO_2$ stream using the process disclosed.

An oil field receives 50 MMSCFD $CO_2$ for the purpose of EOR from a natural $CO_2$ field which is located about 120 Km away. The $CO_2$ conditions and composition are: 50° C., 310 bar, containing $CO_2$ 90%, $CH_4$: 8%, $N_2$: 1% and $H_2S$ 1%, saturated with water.

The entire gas stream is introduced into a reactive mixer/separator at 50° C. 30 MPa [300 bar], where it reacts with $SO_2$. At the reaction temperature and pressure, the reaction product water, accounting for 11 t/d, is formed in liquid phase, whereas the elemental sulphur, accounting for 19 t/d, is formed in solid phase. A portion of the generated elemental sulphur is combusted with air to produce $SO_2$. The relatively sweetened gas stream, containing about 3400 ppmv of $H_2S$ is diverted to an amine unit or other purification units to control the $H_2S$ level in the gas stream is less than 4 ppmv before it is transferred to the oil field for EOR.

The invention claimed is:

1. A process for treating a gas stream comprising hydrogen sulphide, the process comprising the steps of:
    (i) mixing a first gas stream comprising hydrogen sulphide with a second stream comprising sulphur dioxide to produce a combined stream, whereby elemental sulphur is produced by a reaction between the hydrogen sulphide and the sulphur dioxide;
   wherein, the reaction is conducted at a temperature of from 15 to 155° C. and a pressure of at least 3 MPa; and
   wherein the reaction is conducted in the absence of a catalyst;
    (ii) removing elemental sulphur, and optionally water, from the combined stream; and
    (iii) oxidising at least some of the elemental sulphur to form sulphur dioxide for use in the second stream.

2. A process according to claim 1, wherein the flow rate of the second stream is adjusted to maintain a stoichiometric ratio of moles of sulphur dioxide:moles of hydrogen sulphide of 1: 2-2.5.

3. A process according to claim 1, wherein the reaction is conducted at a temperature whereby the elemental sulphur is produced as a solid.

4. A process according to claim 1, wherein the reaction is conducted at a temperature whereby the elemental sulphur is produced as a liquid.

5. A process according to claim 1, wherein the first gas stream comprises a minimum of 50% flammable hydrocarbons, on a molar basis.

6. A process according to claim 1, wherein the first gas stream comprises from 0.05 to 50% by volume of hydrogen sulphide, based on the total volume of gas.

7. A process according to claim 1, wherein the first gas stream is hydrogen sulphide-containing natural gas.

8. A process according to claim 1, wherein the second stream is a gas stream.

9. A process according to claim 1, wherein the reaction in step (i) is conducted at a pressure of at least 7 MPa.

10. A process according to claim 1, wherein the reaction is conducted at a temperature of from 115 to 155° C.

11. A process according to claim 1, wherein water is removed concurrently with the elemental sulphur in step (ii).

12. A process according to claim 1 wherein elemental sulphur and water are removed from the combined stream in step (ii) and separated into a sour water stream and a liquid sulphur stream.

13. A process according to claim 1 wherein at least a portion of the sulphur dioxide formed in step (iii) is used in the second stream of step (i).

14. A process according to claim 1, wherein step (ii) is conducted in a separator unit, the separator unit comprising a gravity separator or a centrifuge or a hydrocyclone.

* * * * *